(12) United States Patent
Johnson

(10) Patent No.: US 11,623,809 B2
(45) Date of Patent: Apr. 11, 2023

(54) FITMENT FOR DISPENSING FLUIDS FROM A FLEXIBLE CONTAINER AND RELATED APPLICATIONS

(71) Applicant: Liqui-Box Corporation, Richmond, VA (US)

(72) Inventor: James W. Johnson, Delaware, OH (US)

(73) Assignee: Liqui-Box Corporation, Richmond, VA (US)

( * ) Notice: Subject to any disclaimer, the term of this patent is extended or adjusted under 35 U.S.C. 154(b) by 21 days.

(21) Appl. No.: 17/223,171

(22) Filed: Apr. 6, 2021

(65) Prior Publication Data

US 2021/0309433 A1    Oct. 7, 2021

Related U.S. Application Data

(60) Provisional application No. 63/006,232, filed on Apr. 7, 2020, provisional application No. 63/006,240, filed
(Continued)

(51) Int. Cl.
| | |
|---|---|
| *B65D 47/06* | (2006.01) |
| *B65D 77/06* | (2006.01) |
| *B67D 3/04* | (2006.01) |
| *B67D 7/02* | (2010.01) |
| *F16K 1/46* | (2006.01) |

(52) U.S. Cl.
CPC ......... *B65D 77/067* (2013.01); *B65D 47/063* (2013.01); *B67D 3/045* (2013.01); *B67D 7/0294* (2013.01); *F16K 1/46* (2013.01)

(58) Field of Classification Search
CPC ....... B65D 77/067; B65D 47/063; F16K 1/46; B67D 7/0294; B67D 3/045
See application file for complete search history.

(56) References Cited

U.S. PATENT DOCUMENTS

| | | |
|---|---|---|
| 4,421,146 A | 12/1983 | Bond et al. |
| 4,445,551 A | 5/1984 | Bond et al. |
| (Continued) | | |

FOREIGN PATENT DOCUMENTS

| | | |
|---|---|---|
| WO | 2004085283 | 10/2004 |

OTHER PUBLICATIONS

PCT, Invitation to Pay Additional Fees, PCT/US2021/025875, dated Aug. 6, 2021 (10 pages).
(Continued)

*Primary Examiner* — Frederick C Nicolas
(74) *Attorney, Agent, or Firm* — McAndrews, Held & Malloy, Ltd.

(57) ABSTRACT

A fitment assembly for use with a spout of a fluid container. The assembly includes a fitment and a poppet seal with a flexible element. The fitment includes a top portion and a bottom portion. The poppet seal extends from the bottom portion into the top portion. An attachment portion secures the flexible element within the bottom portion of the fitment. The flexible element provides a closing force to move the poppet seal from a closed to an open position. The poppet seal has a closed position, an open position, and a transport position. The poppet seal has a central support member that extends from the sealing surface of the poppet seal into the top portion of the fitment in the closed and transport condition.

19 Claims, 11 Drawing Sheets

Related U.S. Application Data on Apr. 7, 2020, provisional application No. 63/006,243, filed on Apr. 7, 2020.

(56) References Cited

U.S. PATENT DOCUMENTS

| | | | |
|---|---|---|---|
| 5,031,662 | A | 7/1991 | Roethel |
| 5,095,962 | A | 3/1992 | Lloyd-Davies et al. |
| 5,477,883 | A * | 12/1995 | Totten .................. B65D 77/067 |
| | | | 251/149.6 |
| 5,680,970 | A | 10/1997 | Smith et al. |
| 5,697,410 | A | 12/1997 | Rutter et al. |
| 5,901,761 | A | 5/1999 | Rutter et al. |
| 5,983,964 | A | 11/1999 | Zielinksi et al. |
| 6,347,785 | B1 | 2/2002 | Copp et al. |
| 6,612,545 | B1 * | 9/2003 | Rutter .................. B65D 77/067 |
| | | | 251/149.6 |
| 6,779,556 | B2 | 8/2004 | Roethel |
| 6,953,070 | B1 | 10/2005 | Labinski et al. |
| 7,487,951 | B2 * | 2/2009 | Johnson ............... B65D 77/067 |
| | | | 251/149.6 |
| 9,862,588 | B2 | 1/2018 | Johnson |
| 10,737,861 | B2 * | 8/2020 | Erickson .............. B65D 31/147 |
| 2012/0305590 | A1 * | 12/2012 | Johnson .................. B67D 3/04 |
| | | | 137/15.01 |
| 2016/0009462 | A1 * | 1/2016 | Erickson ............ B65D 75/5877 |
| | | | 222/545 |
| 2017/0113912 | A1 * | 4/2017 | Johnson ............... B67D 1/0835 |
| 2018/0057236 | A1 | 3/2018 | Erickson |

OTHER PUBLICATIONS

PCT, Notification of Transmittal of the International Search Report and the Written Opinion of the International Searching Authority, or the Declaration, PCT/US2021/025875, dated Sep. 27, 2021 (17 pages).

* cited by examiner

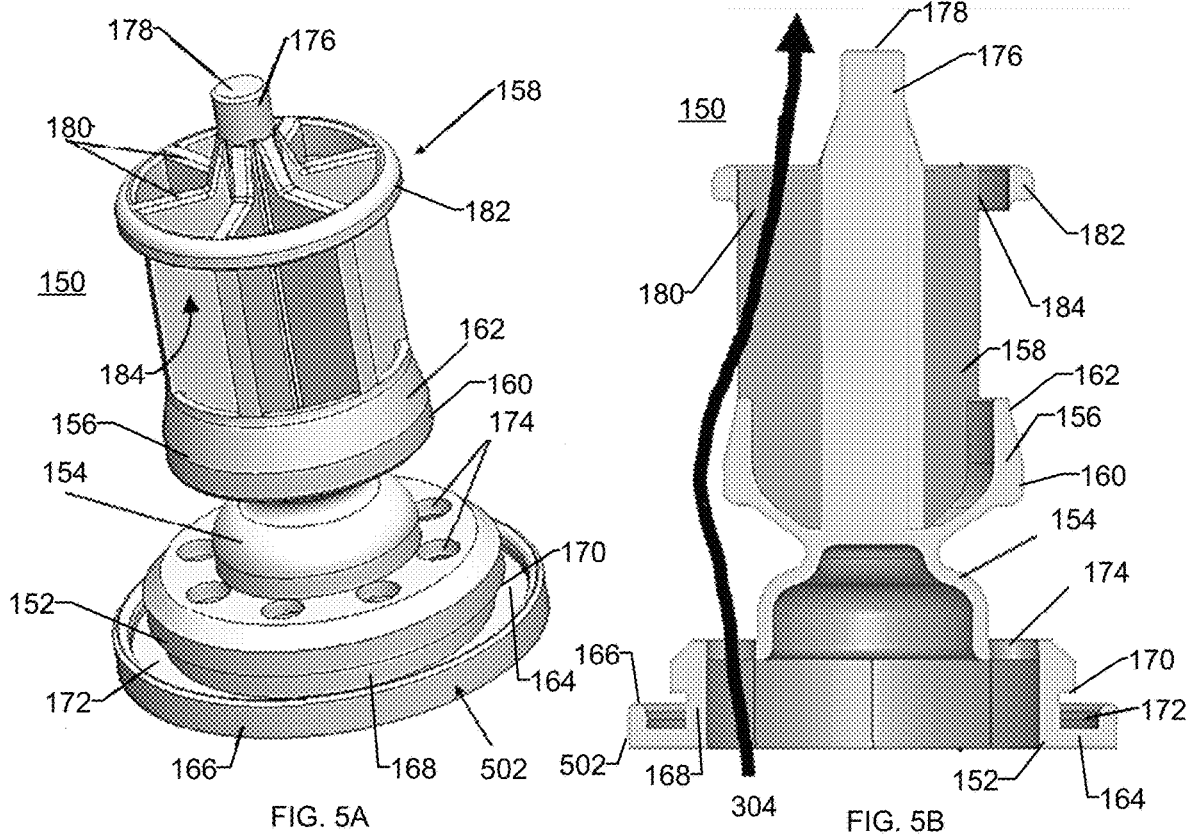
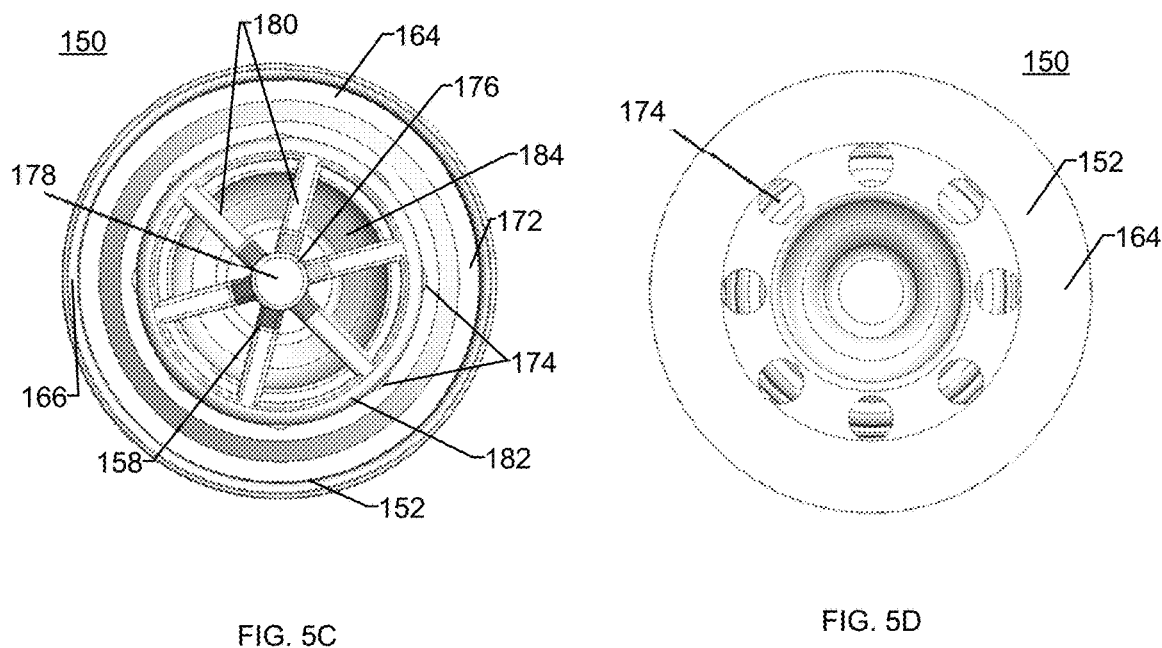
FIG. 5A  FIG. 5B
FIG. 5C  FIG. 5D

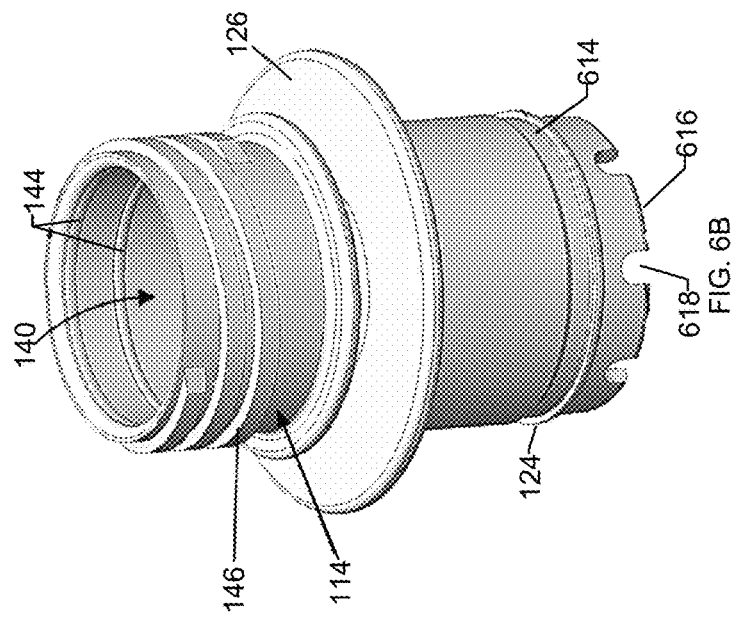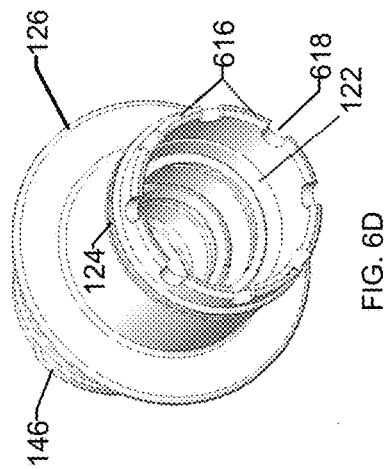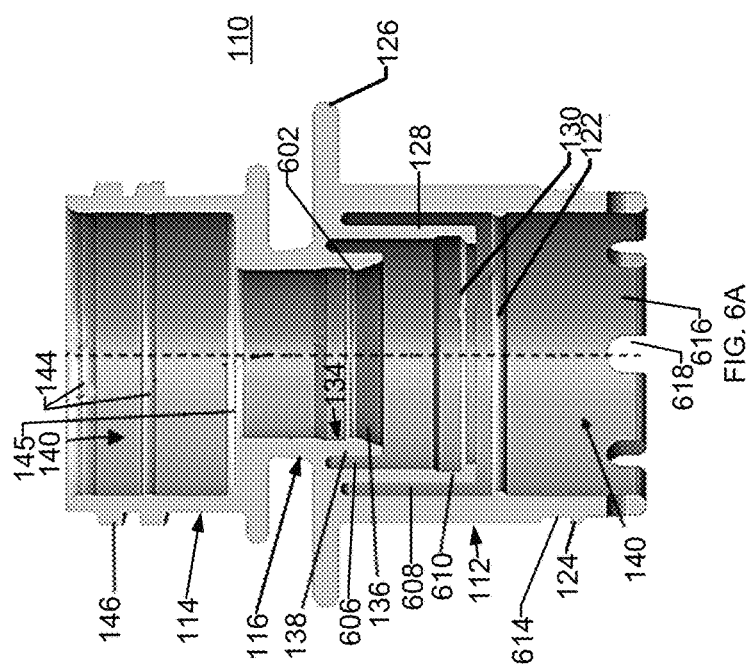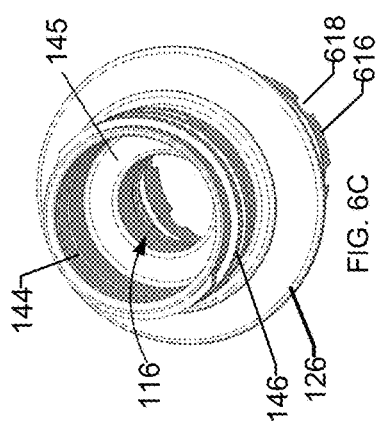

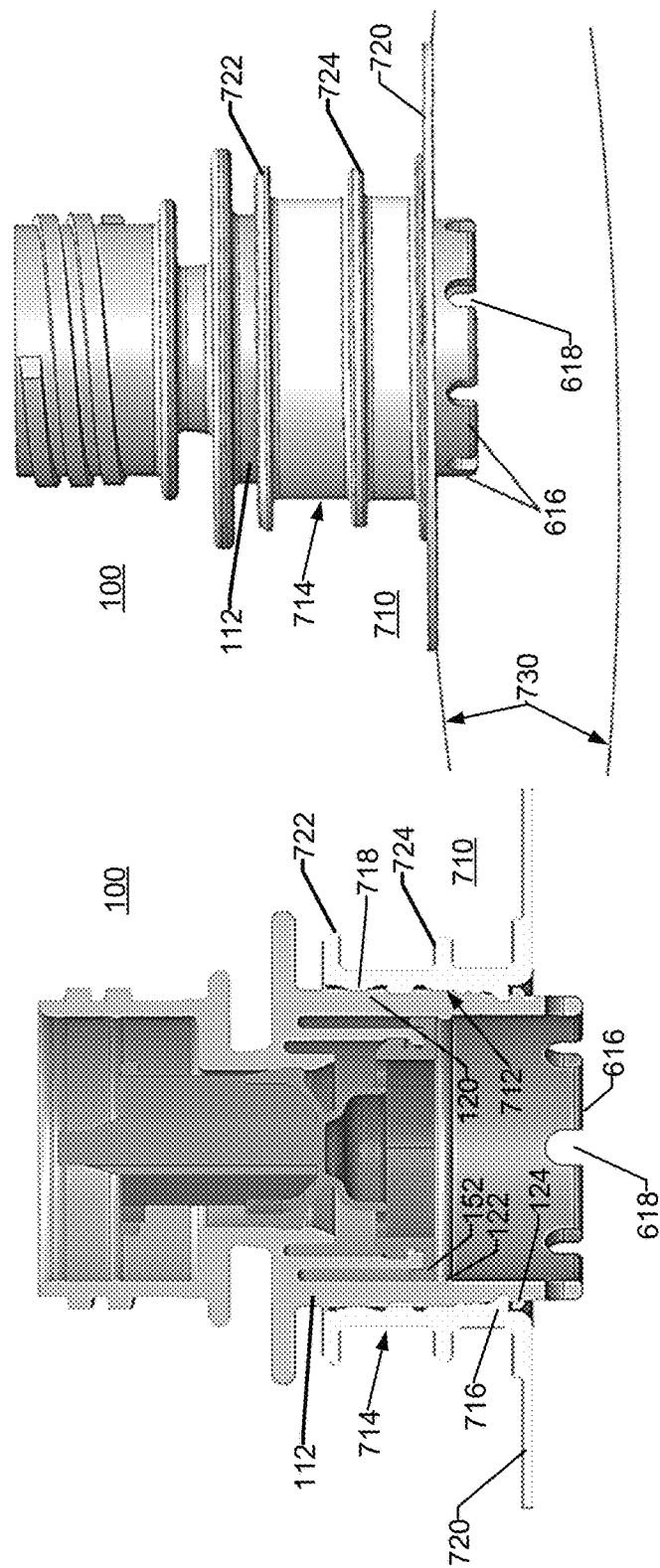
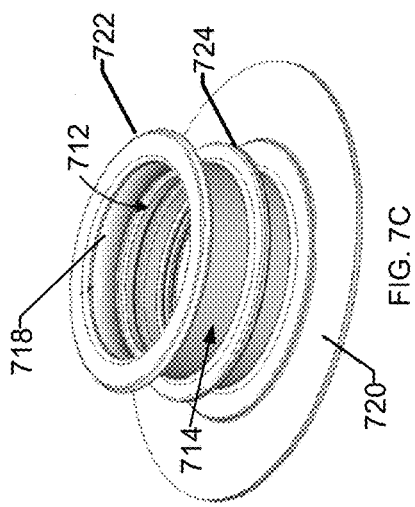
FIG. 7A
FIG. 7B
FIG. 7C

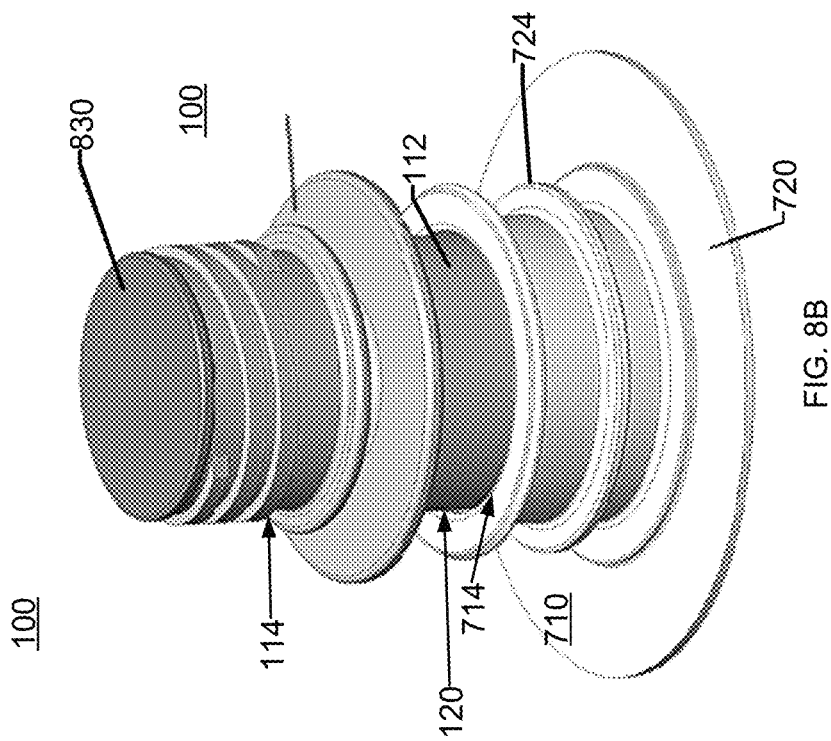
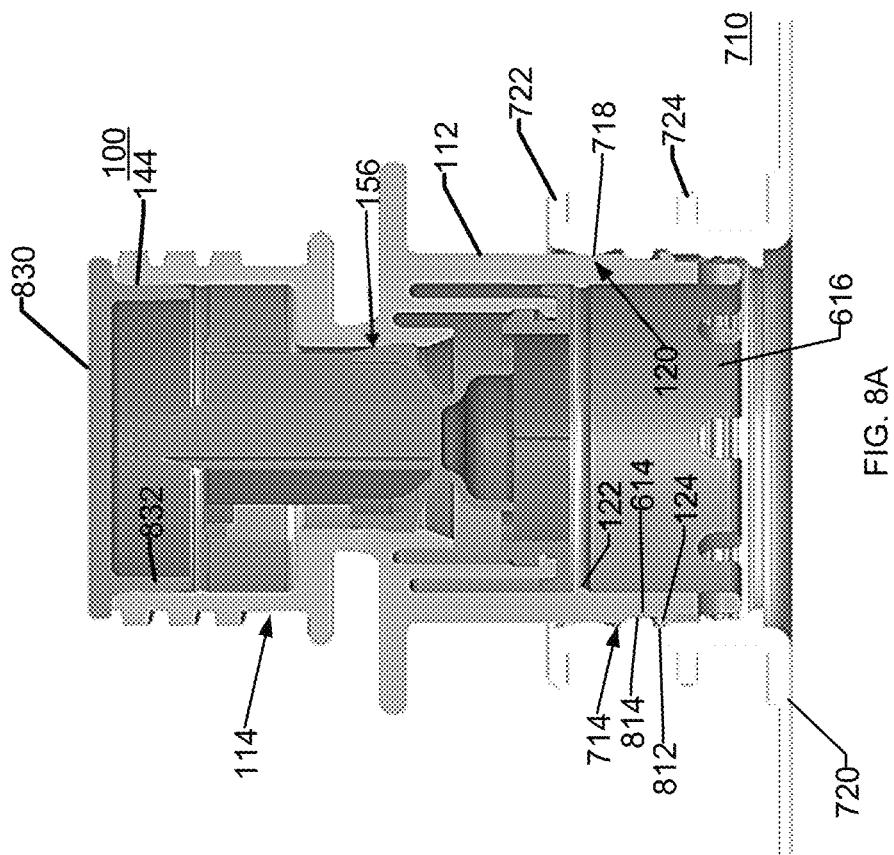
FIG. 8B
FIG. 8A

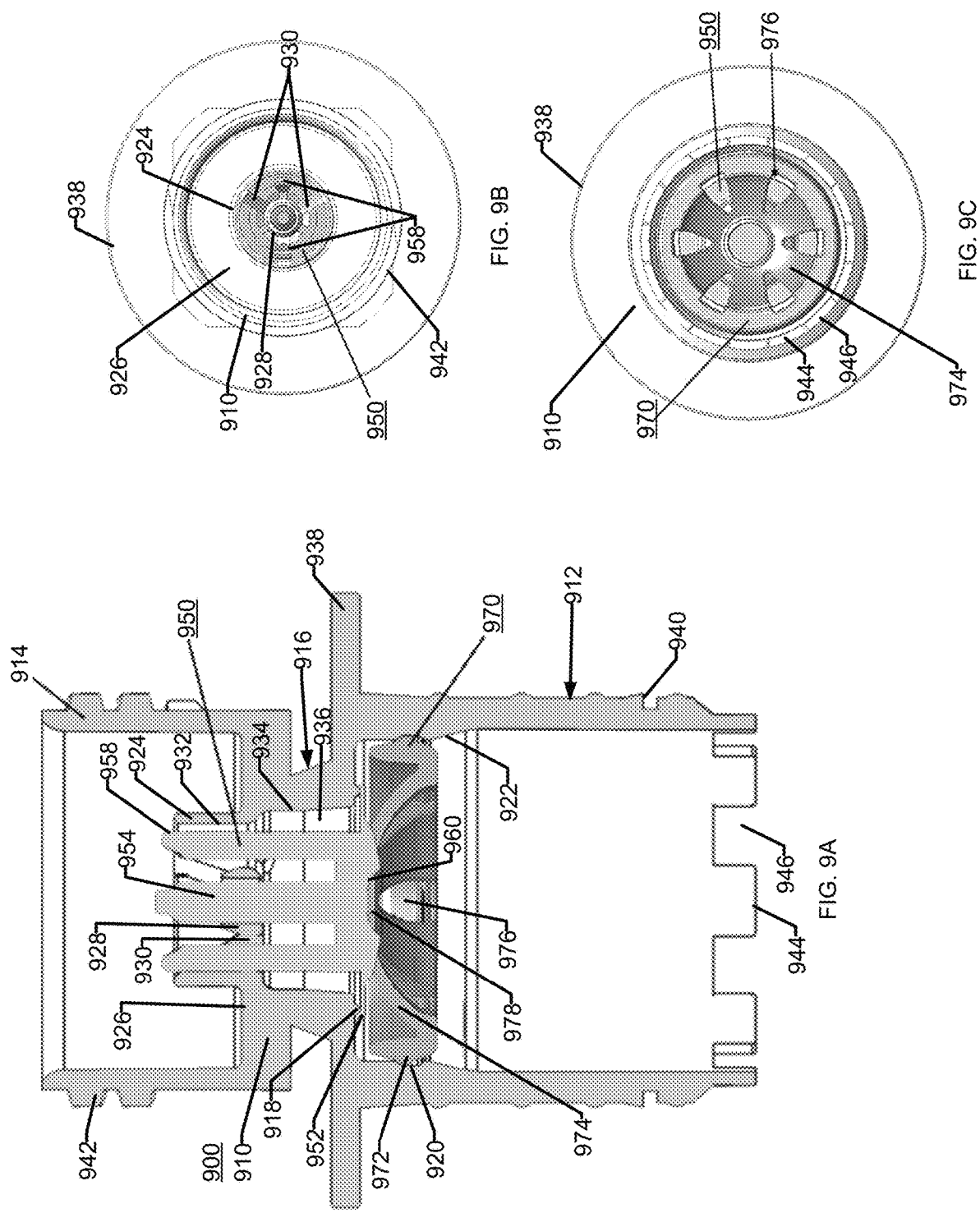

FITMENT FOR DISPENSING FLUIDS FROM A FLEXIBLE CONTAINER AND RELATED APPLICATIONS

RELATED APPLICATIONS

This application is related to, and claims priority to, U.S. Provisional Application No. 63/006,232, filed Apr. 7, 2020, titled "Fitment for Dispensing Fluids from a Flexible Container," U.S. Provisional Application No. 63/006,240, filed Apr. 7, 2020, titled "Fitment for Dispersing Fluids from a Flexible Container," and U.S. Provisional Application No. 63/006,243, filed Apr. 7, 2020, titled "Fitment for Dispersing Fluids from a Flexible Container," the complete subject matter and contents of which are incorporated herein by reference in their entirety.

BACKGROUND

The present disclosure relates to fitment assemblies, and more particularly to a fitment assembly having a movable poppet seal to selectively allow or prevent flow of liquid through the assembly.

Generally, fitment assembles are used in systems that include a flexible bag. The bag is provided with a fitment in the form of a spout through which filling and dispensing occurs. Dispensing can be done via a service line for a beverage mixing and dispensing system that is connected to a pump. It is generally desirable to provide a quick-disconnect coupling between the spout and the service-line. Such a coupling may include a valve and be carried on the spout fitment of the bag and will work in conjunction with the service-line connector or "probe." Because it is discarded with the bag when emptied, in the packaging art it is commonly referred to as a single-service valve and coupling. This type of valve opens automatically as the line connector is connected to the spout and closes as it is disconnected therefrom to prevent syrup from draining from the bag.

SUMMARY

Certain embodiments of the present technology include a fitment assembly for use with a fluid container. The assembly includes a fitment and a poppet seal. The fitment includes a bottom portion, a top portion, and a sealing area. The poppet seal includes a sealing portion, a flexible portion, and an attachment portion. The poppet attachment portion is secured to the bottom portion of the fitment. The fitment assembly has a closed position where the flexible portion undergoes a first amount of deflection which holds the poppet seal in contact with the fitment sealing area preventing fluid from flowing from the fitment bottom portion to the fitment top portion. The fitment assembly has an open position where the flexible portion undergoes a second, greater amount of deflection and the poppet sealing portion is not in contact with the fitment sealing area, allowing fluid to flow between the fitment bottom portion and the fitment top portion.

The poppet attachment portion may include a through hole to provide a flow path past the attachment portion of the poppet.

The flexible portion may include a through hole to provide a flow path past the flexible portion of the poppet.

The fitment sealing area and the poppet sealing portion may each include a tapered sealing surface to provide the contact area between the fitment sealing area and poppet sealing portion in the closed position.

The fitment may include a sealing skirt that extends into the fitment bottom portion. The sealing skirt may include the tapered sealing surface of the fitment.

The fitment may include a sealing protrusion. The poppet may include a flat sealing surface. The seal between the fitment sealing area and the poppet sealing portion in the closed position may be a face seal between the sealing protrusion and the flat sealing surface.

The fitment may include an attachment skirt that extends into the fitment bottom portion. The poppet attachment portion may include an attachment channel configured to receive the attachment skirt. The attachment skirt may also include a skirt protrusion. The poppet attachment portion may include an attachment ledge configured to abut against the skirt protrusion.

The fitment assembly may also have a transport position where the poppet sealing portion is held in place in the fitment sealing area based on the contact between the corresponding surfaces. This contact may also create the seal between the surfaces. The poppet sealing portion may have a non-tapered surface to create the seal in the transportation position. The fitment assembly may have a sealing groove to create the seal in the transportation position.

The poppet seal may include a central support member that extends from the poppet sealing portion of the poppet seal. The central support member may extend into the top portion of the fitment when the fitment assembly is in the closed position.

The poppet seal may include a peripheral support member that extends from the poppet sealing portion of the poppet seal. The peripheral support members may extend into the top portion of the fitment when the fitment assembly is in the closed position.

The peripheral support members may form a flow channel when the fitment assembly is in the open position.

A peripheral support connector may connect the outer edges of two or more peripheral support members.

The fitment may include a support arm and a centering guide. The support arm may extend from the fitment and support the centering guide. The centering guide my receive the poppet central support member and allow the central support member to slide between the open and closed position.

The fitment may include an opening shroud with a cylindrical shape that extends into the top portion of the fitment.

Certain embodiments of the present technology include a fitment assembly for use with a fluid container. The assembly includes a fitment and a poppet seal. The fitment includes a bottom portion, a top portion, and a sealing area. The poppet seal includes a sealing portion, a flexible portion, an attachment portion, and a support portion. The support portion includes a central support member and a plurality of peripheral support members. The peripheral support members extend radially outward from the central support member. The poppet attachment portion is secured to the bottom portion of the fitment. The fitment assembly has a closed position where the flexible portion undergoes a first amount of deflection which holds the poppet sealing in contact with the fitment sealing area preventing fluid from flowing from the fitment bottom portion to the fitment top portion. The fitment assembly has an open position where the flexible portion undergoes a second, greater amount of deflection and the poppet sealing portion is not in contact with the fitment sealing area, allowing fluid to flow between the fitment bottom portion and the fitment top portion. In the open position, the peripheral support members slide within the fitment sealing portion to maintain the poppet sealing portion and support portion centered within the fitment.

Certain embodiments of the present technology include a fitment assembly for use with a fluid container. The assembly includes a fitment and a poppet seal. The fitment includes a bottom portion, a top portion, and a sealing area. The top portion includes an opening shroud having a cylindrical shape that extends into the top portion. The top portion also includes a support arm that extends inward from the opening shroud and a centering guide with a cylindrical shape that is attached to the support arm. The poppet seal includes a flexible portion, an attachment portion, a sealing portion, and a support portion. The support portion includes a central support member that extends from the sealing portion. The poppet attachment portion is secured to the bottom portion of the fitment. The centering guide slidably receives the central support member. The fitment assembly has a closed position where the flexible portion undergoes a first amount of deflection which holds the poppet seal in contact with the fitment sealing area preventing fluid from flowing from the fitment bottom portion to the fitment top portion. The fitment assembly has an open position where the flexible portion undergoes a second, greater amount of deflection and the poppet sealing portion is not in contact with the fitment sealing area, allowing fluid to flow between the fitment bottom portion and the fitment top portion.

BRIEF DESCRIPTION OF THE DRAWINGS

FIG. 5A is a perspective view of the poppet of FIG. 1 in an uncompressed position.

FIG. 5B is a cross section view of the poppet of FIG. 5A.

FIG. 5C is a top view of the poppet of FIG. 5A.

FIG. 5D is a bottom view of the poppet of FIG. 5A.

FIG. 6A is a cross section view of the fitment of FIG. 1.

FIG. 6B is a side perspective view of the fitment of FIG. 6A.

FIG. 6C is a top perspective view of the fitment of FIG. 6A.

FIG. 6D is a bottom perspective view of the fitment of FIG. 6A.

FIG. 7A is a cross sectioned view of the fitment assembly of FIG. 1 in a full-cap position of a spout, in accordance with aspects of this disclosure.

FIG. 7B is a side view of the fitment assembly and spout of FIG. 7A in the full cap position with a container wall attached to the spout, in accordance with aspects of this disclosure.

FIG. 7C is a perspective view of the spout of FIGS. 7A and 7B.

FIG. 8A is a cross sectioned view of the valve assembly of FIG. 1 in the spout of FIG. 7C in a half-cap position with a cap installed into the fitment assembly, in accordance with aspects of this disclosure.

FIG. 8B is a perspective view of the spout, fitment assembly, and cap of FIG. 8A in the half-cap position.

FIG. 9A is a cross sectioned view of a second embodiment of a fitment assembly with a fitment, poppet seal, and flexible member, in accordance with aspects of this disclosure.

FIG. 9B is a top view of the fitment assembly of FIG. 9A.

FIG. 9C is a bottom view of the fitment assembly of FIG. 9A.

DETAILED DESCRIPTION

In the field of liquid containers, there is a need for improved quick disconnect assemblies on containers that have reduced liquid loss during storage, improved flow characteristics during use, improved draining capabilities of the associated container, improved isolation characteristics upon disconnection from associated systems, and increased recyclability after use.

Disclosed are example fitment assemblies with a poppet seal configured for use with bag in box systems or similar containers configured for the storage and dispensing of fluid products. The fitment assemblies are configured to regulate flow out of, and/or selectively seal, a liquid container and may include an in use position, a storage position, and/or a standby position.

As used herein, the terms "first," "second," "third," etc., are used to enumerate instances of similar or identical elements, and do not indicate or imply order unless an order is specifically identified.

As used herein, the term "inner surface" refers to the portion of a given component closest to the fluid flow path and the term "outer surface" refers to the portion of a given component away from the fluid flow path.

Figure 1:
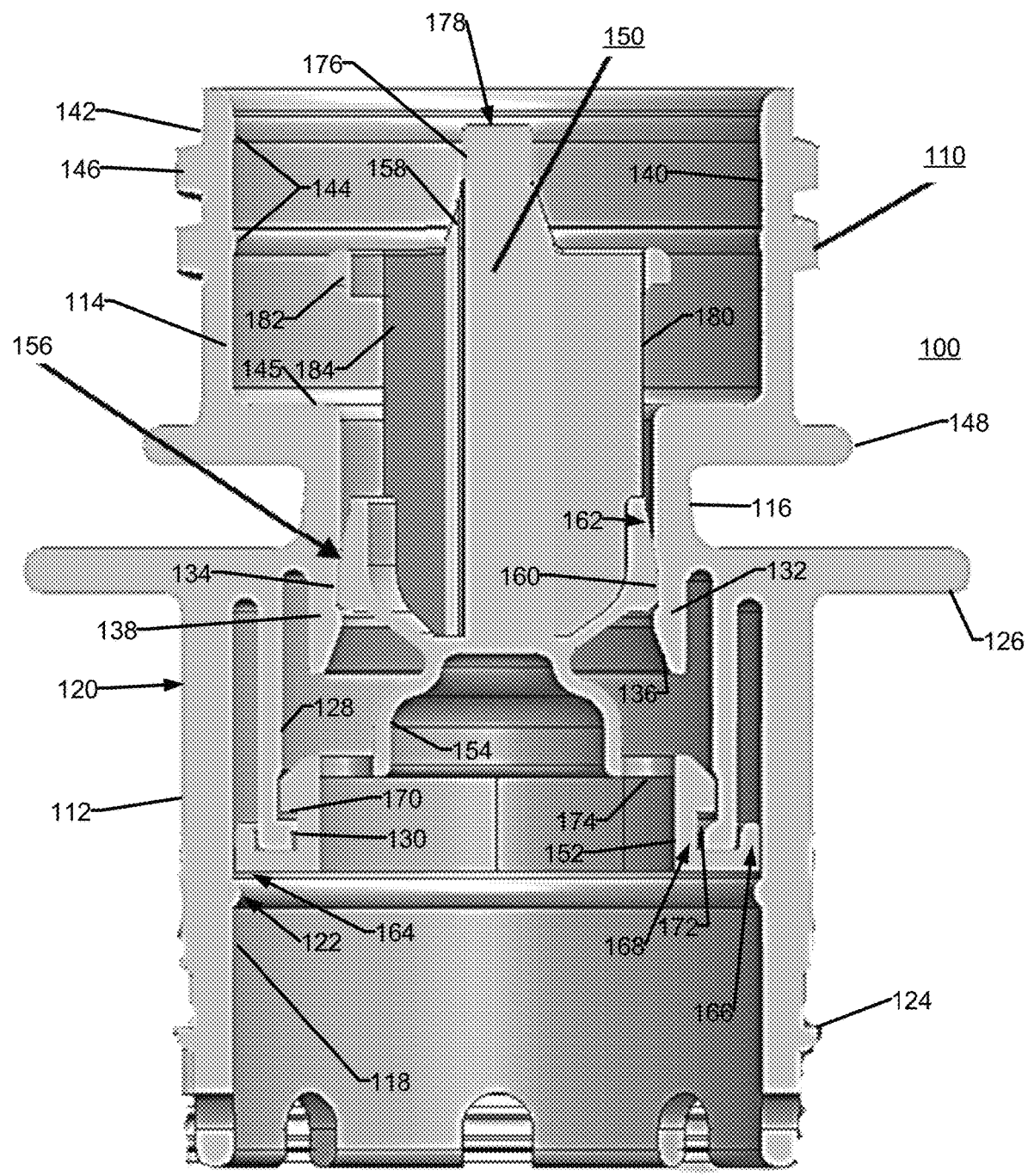
FIG. 1 is a cross section view of a fitment assembly of a container system having a fitment and a poppet seal within the fitment in a closed, transport position, in accordance with aspects of this disclosure.

Turning now to the drawings, FIG. 1 is a cross section view of a fitment assembly 100 in a closed, transport condition. The fitment assembly 100 includes a fitment 110 and a poppet seal 150 within the fitment 110. The fitment 110 has a generally cylindrical bottom portion 112 and a generally cylindrical top portion 114. In some embodiments, a neck portion 116 connects the bottom portion 112 and the top portion 114 of the fitment 110. The neck portion 116 has a smaller diameter than the bottom and top portions 112 and 114.

The bottom portion 112 has an inner surface 118 and an outer surface 120. The inner surface 118 includes an attachment protrusion 122. The outer surface 120 includes a retention protrusion 124. A bottom portion flange 126 extends from the outer surface 120 of the bottom portion 112 below the neck portion 116 of the fitment 110. The bottom portion 112 may include an attachment skirt 128 extending downwardly therefrom. The attachment skirt 128 may include an inwardly extending attachment skirt protrusion 130. The attachment skirt 128 may extend into the bottom portion 112 below the neck portion 116 of the fitment 110.

The fitment 110 has a sealing portion 132 on an internal surface thereof. The sealing portion 132 may include a sealing groove 134. The sealing portion 132 may include a sealing taper 136. The sealing portion 132 may be located on a sealing skirt 138. The sealing skirt 138 may extend downward into the bottom portion 112 below the neck portion 116 of the fitment 110.

The top portion 114 of the fitment 110 includes an inner surface 140 and an outer surface 142. The inner surface 140 may include one or more internal protrusions 144. The top portion 114 has a base area 145 just above the neck portion 116 of the fitment. The outer surface 142 includes external threads 146. A top portion flange 148 may extend from the outer surface 142 of the top portion 114 above the neck portion 116 of the fitment 110.

The poppet seal 150 is configured to regulate fluid flow between the bottom portion 112 and the top portion 114 of the fitment 110. The poppet seal 150 includes an attachment portion 152, a dome-shaped deformable portion 154 from which the attachment portion 152 downwardly extends, a bowl-shaped sealing portion 156 extending upwardly from the deformable portion 154, and a cylindrical support portion 158 that extends upwardly from the sealing portion 156. In the closed position shown in FIG. 1, the sealing portion 156 of the poppet seal 150 contacts the sealing portion 132 of the fitment 110 preventing fluid flow between the bottom portion 112 and the top portion 114 of the fitment 110. The poppet sealing portion 156 may have a transport sealing surface 160 and a tapered sealing surface 162. In the closed, transport condition, shown in FIG. 1, the transport sealing surface 160 is positioned in the sealing groove 134 preventing fluid flow between the bottom portion 112 and the top portion 114 of the fitment 110. In some embodiments, the sealing groove 134 may be omitted from the fitment 110. In these embodiments, the transport sealing surface 160 may seal against the inner surface of the sealing skirt 138, the inner surface of the neck portion 116, or another sealing surface on the fitment 110 when the fitment assembly 100 is in a closed, transport condition.

The attachment portion 152 of the poppet seal 150 may include one or more features to secure the poppet seal 150 in the fitment bottom portion 112. In some embodiments, a poppet bottom 164 contacts the attachment protrusion 122 of the fitment 110. The attachment portion 152 may include an outer wall 166, an inner wall 168, and an attachment ledge 170. The outer wall 166, the inner wall 168, and the poppet bottom 164 may define an attachment channel 172. The attachment channel 172 may be configured to receive a bottom portion of the attachment skirt 128. The attachment ledge 170 may be configured to contact the skirt protrusion 130 to retain the skirt protrusion 130 in the channel 172. In some embodiments, the fitment assembly 100 may rely only on mechanical features to secure the poppet seal 150 within the fitment 110. In other embodiments, an adhesive, sonic welding, or another similar method may be used in addition to or instead of the mechanical features to secure the attachment portion 152 to the bottom portion 112 of the fitment 110.

The deformable portion 154 may connect the attachment portion 152 to the sealing portion 156 of the poppet seal 150. The deformable portion 154 may be in an uncompressed position when the fitment assembly 100 is in the closed, transportation condition. The poppet seal 150 also includes one or more vertically extending through holes 174 to allow fluid to flow through the poppet seal 150 when the fitment assembly 100 is in an open condition.

The support portion 158 extends above the sealing portion 156 of the poppet seal 150. The support portion 158 may include a central support member 176. The central support member 176 may include a connector engagement surface 178 on the top surface of the central support member 176. The support portion 158 may include one or more wall-shaped peripheral support members 180. The peripheral support members 180 may extend radially from the central support member 176. The peripheral support members 180 may extend axially from the poppet tapered sealing surface 162. In some embodiments, a ring-shaped peripheral support connector 182 may connect two or more peripheral support members 180. A flow channel 184 may be formed between two or more peripheral support members 180.

The fitment 110 and poppet seal 150 may both be molded plastic components to enhance the recyclability of the container after use as compared to conventional fitment assemblies that rely on metal spring components to provide the closing force of the poppet seal.

Figure 2B:
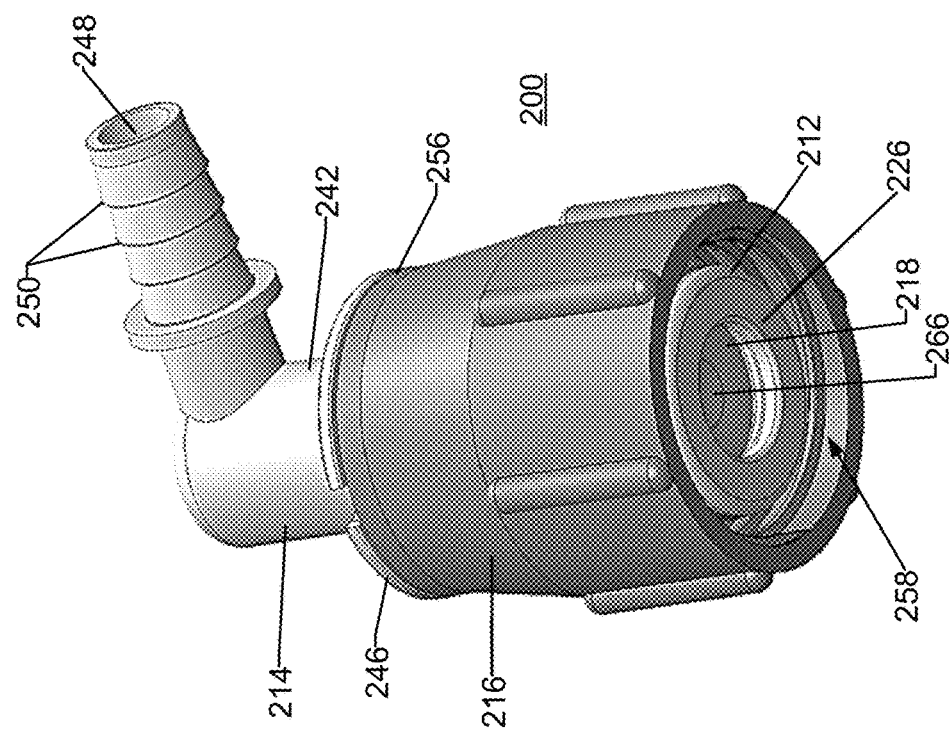
FIG. 2B is a perspective view of the connector assembly of FIG. 2A.
Figure 2A:
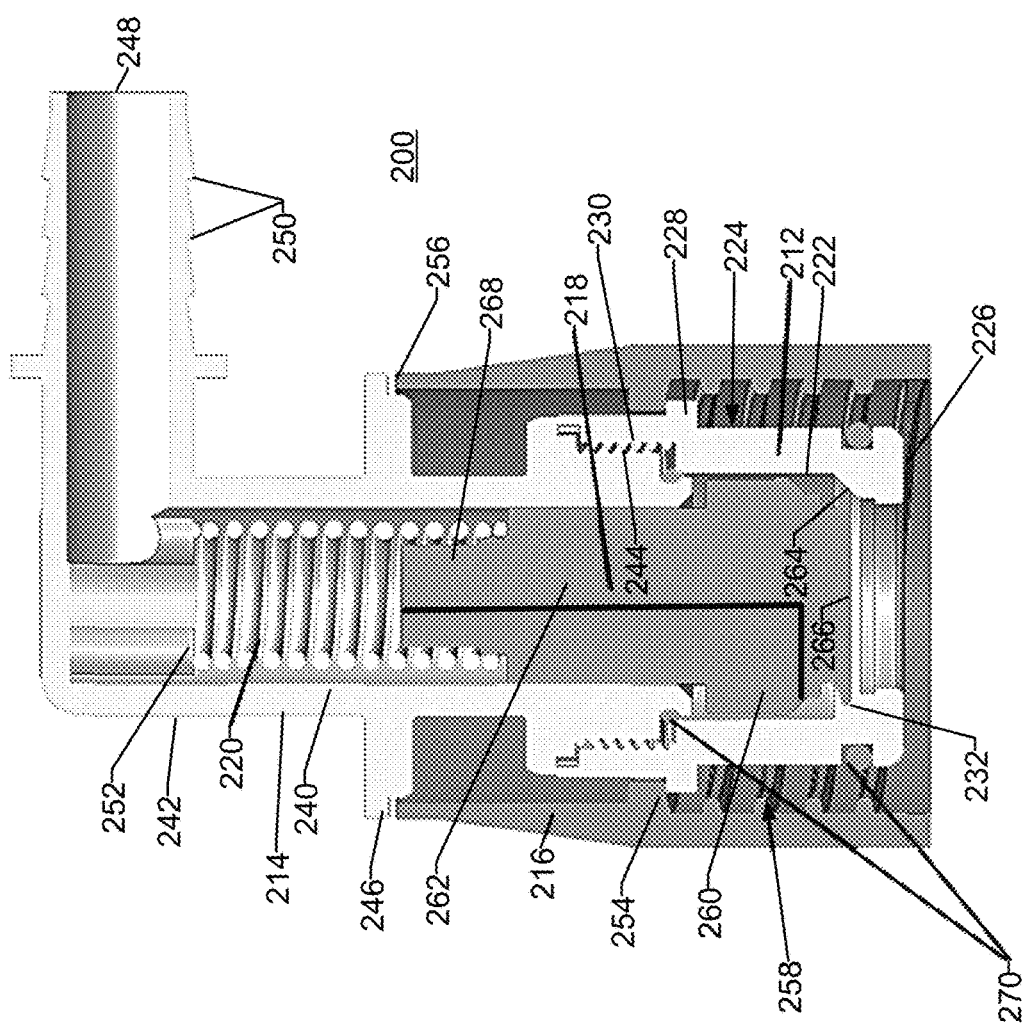
FIG. 2A is cross section view of a connector assembly that may be used with the fitment assembly of FIG. 1, in accordance with aspects of this disclosure.

FIG. 2A shows a cross section view of a connector assembly 200 that may be used with the fitment assembly of FIG. 1. FIG. 2B shows a perspective view of the connector assembly 200 of FIG. 2A. In some embodiments, the connector assembly 200 may include a lower connector body 212, an upper connector body 214, a connector collar 216, a connector poppet 218, and a connector spring 220. The connector assembly 200 may be attached to a drink dispensing system or other fluid system configured to receive the contents of the container sealed by a fitment assembly, such as the fitment assembly of FIG. 1.

The cylindrical lower connector body 212 includes an inner surface 222, an outer surface 224, and a bottom surface 226. The lower connector body 212 may include a retention flange 228 extending from the outer surface 224. The lower connector body 212 include internally extending lower body threads 230. The inner surface 222 of the lower connector body 212 may include a connector poppet sealing surface 232.

The upper connector body 214 includes an inner surface 240 and an outer surface 242. The upper connector body 214 may include outwardly extending upper body threads 244. The upper body threads 244 are configured to thread into the lower body threads 230 when the connector assembly 200 is assembled. The upper connector body 214 may include a collar-centering flange 246. The upper connector body 214 includes an outlet 248. The upper connector body 214 may connect the connector assembly 200 to the associated fluid system. In some examples, the upper connector body 214 may include retention barbs 250 to retain a connected hose of the attached fluid system. In other embodiments, the upper connector body 214 may attach to the associated fluid system using a connector with internal threads, a connector with external threads, a connector with a hose quick connect, or another type of connection known in the art for connection to a hose or pipe. The inner surface 240 of the upper connector body 214 may include a spring support surface 252.

The connector collar 216 includes a closing ledge 254. The closing ledge 254 abuts against the top surface of the retention flange 228 of the lower connector body 212. The connector collar 216 includes an upper surface 256. The upper surface 256 may engage the collar-centering flange 246. The connector collar 216 includes internal connector threads 258.

The connector poppet 218 includes a lower portion 260 and an upper portion 262. The connector poppet 218 may have a sealing surface 264 capable of sealing against the lower connector body sealing surface 232. The connector poppet 218 may have one or more mating surfaces 266 configured to abut against corresponding features of the fitment assembly poppet seal 150. The lower portion 260 of the connector poppet 218 may have a larger outer diameter than the upper portion 262 allowing the lower portion 260 to abut against the upper connector body 214 thereby limiting the amount of upward movement of the connector poppet 218. The outer diameter of the upper portion 262 allows a portion of the connector poppet 218 to slide within the inner surface 240 of the upper connector body 214. The upper portion 262 may include a spring centering post 268 to help center the connector spring 220 and allow the connector spring 220 to provide a uniform force on the top upper portion 262 of the connector poppet 218.

In some embodiments, the connector assembly 210 may use one or more O-rings or elastomeric gaskets 270 to create a seal between components within the connector assembly 210, such as between the lower connector body 212 and the upper connector body 214, or create a seal to the fitment assembly or the associated fluid system connection. In other embodiments, surface features such as bumps or ridges may be used in addition to or instead of the elastomeric gaskets 270 create the seals between components and/or assemblies.

Figure 3:
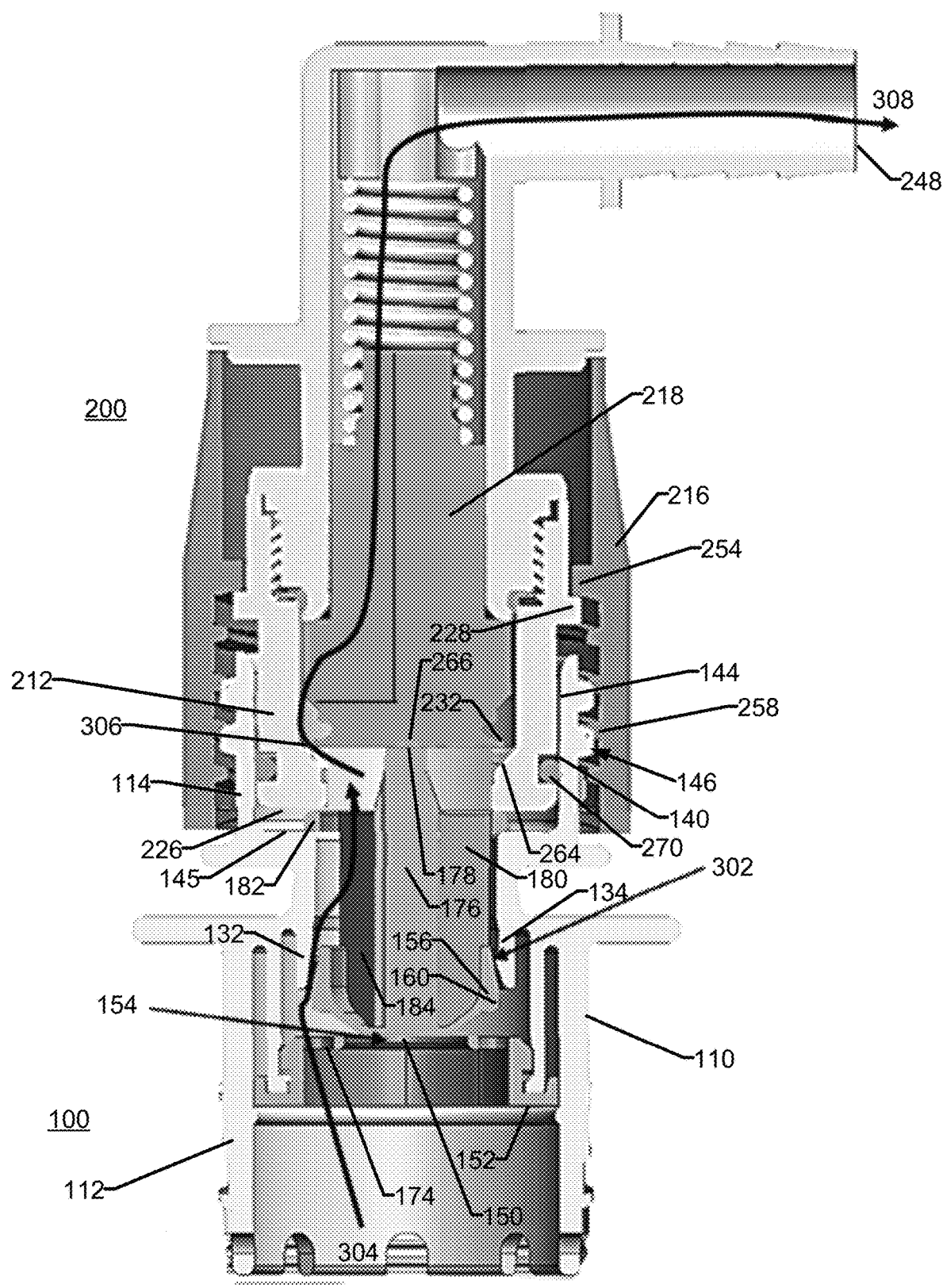
FIG. 3 is a cross section view of the fitment assembly of FIG. 1 in an open position with the connector assembly of FIG. 2A attached.

FIG. 3 shows a cross section view of the connector assembly 200 of FIG. 2 attached to the fitment assembly 100 of FIG. 1 with the fitment assembly 100 in an open position. The connector assembly 200 has been screwed onto the fitment assembly 100. In that regard, the connector threads 258 of the connector collar 216 are engaged with the external threads 146 of the fitment 110. The closing ledge 254 of the connector collar 216 engages the retention flange 228 of the lower connector body 212 driving the lower connector body 212 into the top portion 114 of the fitment 110.

In some embodiments, as the lower connector body 212 enters the top portion 114 of the fitment 110, the bottom surface 226 of the lower connector body 212 abuts against the peripheral support connector 182 and forces the poppet sealing portion 156 into the fitment 110 causing the fitment assembly poppet 150 to move from the closed, transportation position shown in FIG. 1. In other embodiments, the bottom surface 226 or other portion of the lower connector body 212 may contact the peripheral support members 180 and/or the central support member 176 in order to force the poppet sealing portion 156 into the fitment 110. In other embodiments, the connector poppet 218 may contact one or more portions of the fitment assembly poppet 150. In these embodiments, the lower connector body 212 may not contact the fitment assembly poppet 150, and instead may abut against the base area 145 or some other area of the top portion 114 of the fitment 110.

As the poppet sealing portion 156 begins to move within the fitment 110, the transport sealing surface 160 exits the sealing groove 134 of the fitment 110 to create a gap 302 between the sealing portion 132 of the fitment 110 and the poppet sealing portion 156. The attachment portion 152 of the poppet seal 150 remains stationary within the bottom portion 112 of the fitment 110. As a result of the movement of the sealing portion 156 downward and the non-movement of the attachment portion 152 of the poppet 150, the deformable portion 154 compresses and creates an opposing force upward against the poppet sealing portion 156.

The gap 302 between the sealing portion 132 of the fitment 110 and the poppet sealing portion 160 creates a fitment flow path 304 from the bottom portion 112 to the top portion 114 of the fitment 110 resulting in an open condition of the fitment assembly 100. In some embodiments, the flow path 304 through the fitment assembly 100 may include the fluid entering the bottom portion 112 of the fitment 110, flowing through the through holes 174 of the poppet 150, through the gap 302 between the fitment sealing portion 132 and the poppet sealing portion 156, through the poppet flow channels 184, into the top portion 114 of the fitment 110 and/or into the connector assembly 200.

In some embodiments, the poppet 150 of the fitment assembly 100 may be used to move the connector poppet 218 when the fitment assembly 100 and connector assembly 200 are connected to allow liquid to flow through the connector assembly 200 to the outlet 248. The contact surface 178 on the top of the fitment poppet 150 may abut against the mating surface 266 of the connector poppet 218. In some embodiments, the peripheral support connector 182 of the fitment poppet 150 may contact the base area 145 of the fitment top portion 114 limiting the downward travel of the poppet 150 within the fitment assembly 100. In other embodiments such as those without a peripheral support connector 182, the travel of the poppet sealing portion 156 may be limited by ability of the deformable portion 154 to deflect downward based on the shapes of the deformable portion 154, the attachment portion 152, and/or the sealing portion 158 of the poppet 150. The movement of the connector poppet 218 into the connector assembly 200 may create a connector gap 306 between the sealing surface 232 of the connector poppet 218 and the sealing surface 264 of the lower connector body 212. This connector gap 306 may create a connector flow path 308 for the fluid to flow through the lower connector body 212, past the connector poppet 218, through the upper connector body 214, and/or through the outlet 248 of the upper connector body 214. The connector outlet 248 is connected, for example, via the barbs 250, to a tube, hose, or other conduit that is connected to a pump or other device that creates a vacuum in the line that sucks the fluid out of the container and through the flow paths 304 and 308 and the tube to a dispensing station.

The inner surface 140 of the fitment top portion 114 may create a fluid seal against the lower connector body 212. The internal protrusions 144 of the fitment top portion 114, the connector assembly O-rings 270, and/or protrusions on the outer surface of the lower connector body 212 may be used to create the fluid seal between the fitment top portion 114 and the lower connector body 212 and allowing the fitment flow path 304 to connect with the connector flow path 308. The internal protrusions 144 and/or connector assembly O-rings 270 may be configured to create a seal between the connector assembly 200 and fitment assembly 100 prior to either the fitment assembly poppet 150 or the connector assembly poppet 218 leaving their sealed positions.

One would recognize other connectors may be used with the fitment assembly 100 of FIG. 1. These other connectors may not include a connector poppet like the dispensing connector described in U.S. Pat. No. 9,862,588, which is incorporated herein by reference.

Figure 4:
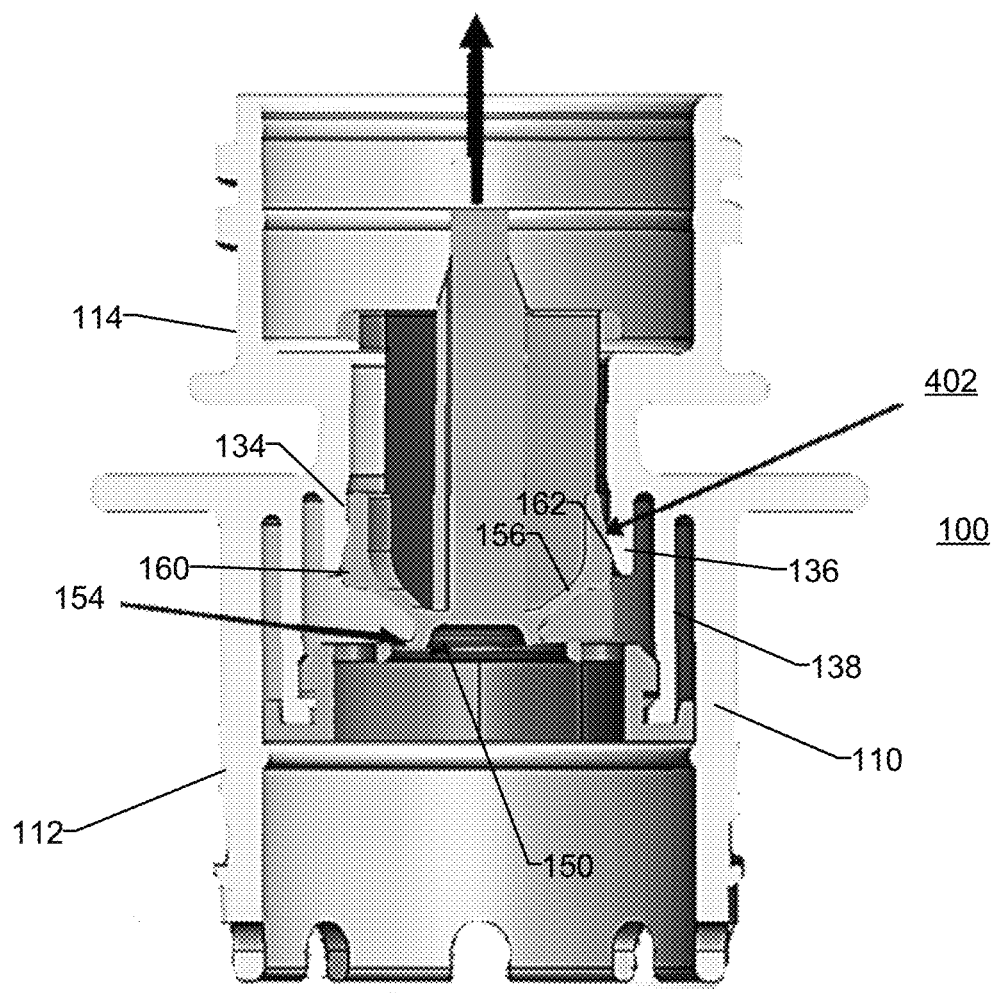
FIG. 4 is a cross section view of the fitment assembly of FIG. 1 in a closed, after-use position.

FIG. 4 shows a cross section view of the fitment assembly 100 of FIG. 1 in a closed, after-use condition. After unscrewing and removing the connector assembly 200, the energy stored in deformable portion 154 of the poppet 150 forces the poppet sealing portion 156 upward. The poppet tapered sealing surface 162 contacts the fitment sealing taper 136 creating an after use seal 402 between the surfaces. The poppet tapered sealing surface 162 and the fitment sealing taper 136 in some examples may have the same angle to maximize the contact area between the surfaces. In other examples, the angles for the poppet tapered sealing surface 162 and fitment sealing taper 136 may be adjusted to compensate for any expected deflection of components, such as the sealing skirt 138, in the closed, after use condition.

The after use seal 402 seals the fitment assembly flow path 304 of FIG. 3 between the fitment bottom portion 112 and the fitment top portion 114, preventing further release of fluid from or to the associated container. In many cases, the connector assembly will only be attached to a given fitment assembly 100 a single time and disconnected after the contents of the container have been effectively removed. In these instances, the closed, after-use condition still provides a benefit by preventing or minimizing any residual fluid from exiting the container as the container disposed of. In other embodiments, the force of the deformable portion 154 may further push the poppet sealing portion 156 back to the closed, transport condition of FIG. 1 by moving the transport sealing surface 160 back in contact with the sealing groove 134.

FIG. 5A shows a perspective view of the poppet 150 of FIG. 1 in an uncompressed position. FIG. 5B shows a cross section view of the poppet 150. FIG. 5C shows a top view of the poppet 150. FIG. 5D shows a bottom view of the poppet 150.

FIGS. 5A and 5B show the attachment portion 152, the deformable portion 154, the sealing portion 156, and the support portion 158 of the poppet 150. In the present embodiment, the transport sealing surface 160 and tapered sealing surface 162 are two distinct, flat, and adjacent surfaces. In other embodiments, either the transport sealing surface 160 and/or the tapered sealing surface 162 may have a curved surface. In yet other embodiments, a flat tapered sealing surface 162 may provide a smooth transition into the transport sealing surface 160 such that the separation of the sealing surfaces may not be seen and may only be apparent as the fitment assembly 100 transitions from the closed transport condition to the as shown in FIG. 1, to the closed, after-use condition, as shown in FIG. 4. In other embodiments, the sealing portion 156 may only have a single curved or flat surface.

As shown in FIGS. 5A and 5B, the deformable portion 154 is in the uncompressed, relaxed state. In some fitment assemblies, the alignment of the transport sealing surface 160 and the corresponding sealing groove keep the deformable portion 154 in this uncompressed state until the attachment of a connector assembly. Minimizing the time the deformable portion 154 is in a compressed state may help prevent the permanent distortion or compression set of the material of the deformable portion 154, as opposed to the intended elastic bending of the deformable portion. Minimizing or preventing the permanent distortion of the deformable portion 154 thereby helps the deformable portion 154 provide the required closing force to place the fitment assembly into a closed state after removal of a connector assembly.

FIGS. 5A through 5C show the support portion 158 of the poppet seal 150. In some embodiments, the support portion 158 may include the one or more peripheral support members 180 extending from the central support member 176. The central support member 176 and/or peripheral support members 180 may create the flow channels 184 for the fitment flow path 304 when the fitment assembly 100 is in the open position. As shown, the present embodiment has six peripheral support members 180 and six flow channels 184; however, other designs may have fewer or more peripheral support members 180 and/or flow channels 184. The central support member 176 may have the connector engagement surface 178 that may be used for compressing the poppet seal 150 of the fitment assembly 100 and/or the connector poppet 200. As shown, the peripheral support connector 182 may connect one or more of the peripheral support members 180. In the present embodiment, the peripheral support connector 182 extends outward radially from the outer edge of the peripheral support members 180 which allows the peripheral support connector 182 to contact the base area 145 of the top portion 114 of the fitment 110. In other embodiments, the peripheral support connector 182 may be radially flush with the peripheral support members 180 to help center the poppet seal 150 within the fitment 110 while helping to prevent the deflection of the peripheral support members 180.

FIGS. 5A-5D show different aspects of the attachment portion 152 and the through holes 174. As shown, the poppet seal 150 has eight, evenly spaced, circular through holes 174. In other embodiments, the poppet seal 150 may have through holes 174 with other shapes, different quantities, and/or with a different spacing. In some embodiments, the through holes 174 may be centered on the flow channels 184 to minimize the turbulence of fluid through the fitment flow path 304. In other embodiments, placement and design of the through holes 174 may be used to enhance turbulence through the fitment flow path 304. The attachment portion 152 may define the attachment channel 172 that accepts and engages the fitment attachment skirt 128. The attachment channel 172 may include the outer wall 166, inner wall 168, poppet bottom 164, and/or the attachment ledge 170. The attachment ledge 170 may abut against the skirt protrusion 130 of the fitment attachment skirt 128. The outer wall 166 may help keep the attachment ledge 170 engaged with the skirt protrusion 130 by providing a physical barrier to further outward radial travel of the skirt protrusion 130 after assembly. In some embodiments, the outer surface 502 of the outer wall 166 may also provide a mating surface to either glue or sonically weld the attachment portion 152 to the inner surface 118 of the lower portion 112 of the fitment 110.

FIG. 6A shows a cross section view of the fitment 110 of FIG. 1. FIG. 6B shows a side perspective view of the fitment 110 of FIG. 1. FIG. 6C shows a top perspective view of the fitment 110 of FIG. 1. FIG. 6D shows a bottom perspective view of the fitment 110 of FIG. 1.

The neck portion 116 connects the bottom portion 112 with the top portion 114 of the fitment 110. The sealing skirt 138 may extend into the bottom portion 114 and may include the sealing taper 136 and/or the sealing groove 134. A transportation bump 602 may separate the sealing taper 136 and the sealing groove 134. The transportation bump 602 may help retain the transportation sealing surface 160 of the poppet seal 150 within the sealing groove 134 during storage and transportation. In other embodiments, the sealing groove 134 may be omitted, and the fitment 110 may keep a constant neck inner diameter 604 and rely on the amount of interference between the poppet transportation sealing surface 160 and the neck inner diameter 604 to maintain a closed fitment assembly. The neck inner diameter 604 is larger than the outer diameter of the poppet peripheral support members 180, allowing the peripheral support members 180 to freely slide in and out of the neck portion 116 while still supporting the alignment of the poppet 150 during the attachment and removal of the connector assembly 200.

The space between the sealing skirt 138 and attachment skirt 128 creates a skirt channel 606. The skirt channel 606 may allow for some deflection of the sealing skirt 138 as the poppet transportation sealing surface 160 moves past the transportation bump 602 and into, or out of, the sealing groove 134. The deflection may reduce the force required during the assembly and operation of the fitment assembly 100 while providing the required sealing characteristics when the poppet 150 is stationary. The angle for the fitment sealing taper 136 may be adjusted in relation to the poppet tapered surface 162 and the expected amount of deflection of the sealing skirt 138 in the closed, after-use condition. In embodiments without an attachment skirt 128, the space between the sealing skirt 138 and the bottom portion inner surface 140 may form the skirt channel 606. In other embodiments, the sealing skirt 138 may extend into the fitment bottom portion 112 without a skirt channel 606 between the attachment skirt 128 and/or other areas of the fitment bottom portion 112.

The attachment protrusion 122, attachment skirt 128, and/or the bottom portion inner surface 140 may secure the poppet attachment portion 152 within the fitment bottom portion 112. The attachment protrusion 122 may abut against the poppet bottom 164 or another surface on the outer portion 166 of the poppet 150. The attachment protrusion 122 may allow the poppet attachment portion 152 to slide upward past the attachment protrusion 122 during assembly, but prevent the poppet attachment portion 152 from moving downward past the attachment protrusion 122 after assembly. In some embodiments, the opening between attachment skirt 128 and the bottom portion inner surface 140 may form an attachment channel 608. In some cases, the attachment channel 608 may start just below the bottom portion flange 126 or may start closer to the skirt protrusion 130. The attachment channel 608 may accept a portion of the poppet outer wall 166. The attachment skirt 128 may include a skirt groove 610. The skirt groove 610 is located just above the skirt protrusion 130 and receives the attachment ledge 170 to allow a larger contact area between the skirt protrusion 130 and the poppet attachment ledge 170.

The bottom portion 112 may include the retention protrusion 124 and a retention groove 614 to secure the bottom portion 112 within the spout of a container. In some embodiments, the bottom portion 112 may include one or more stand-off protrusions 616 with corresponding stand-off gaps 618 between the stand-off protrusions 616. The stand-off protrusions 616 may extend below the base of the spout. The stand-off gaps 618 may provide a flow path past the stand-off protrusions 616 while the protrusions 616 prevent the bag walls from covering or entering the opening of the bottom portion 112 when the container is nearly empty.

The top portion 114 may include one or more internal protrusions 144 on the inner surface 140. The internal protrusions 144 may be used in addition to or instead of any sealing surfaces on the connector assembly 200. The top portion 114 may also include external threads 146. The external threads 146 may provide the method of attachment of the connector assembly 200 to the fitment 100. The base area 145 may provide a contact surface for the poppet peripheral support connector 182 or the bottom surface 226 of the lower connector 212 when the connector assembly 200 is attached to the fitment top portion 114.

FIG. 7A is a cross section view of the fitment assembly 100 of FIG. 1 in a full-cap position within an example spout 710. FIG. 7B is a side view of the fitment assembly 100 with the spout 710 of FIG. 7A along with a container wall 830 of a film bag container attached to the spout 710. FIG. 7C is a perspective view of the spout 710 of FIGS. 7A and 7B. The spout 710 may be like the spout described in U.S. Pat. No. 9,862,588, which is incorporated herein by reference.

The spout 710 may have an inner surface 712 and an outer surface 714. The inner surface 712 may have a locking protrusion 716. In the full-cap position, the locking protrusion 716 may engage the fitment retention protrusion 124, preventing the removal of the fitment assembly 100 from the spout 710 without excessive force and/or damage to the spout 710 and/or fitment assembly 100. The fitment assembly 100 and spout 710 may be placed in the full-cap position after the container has been filled to seal the container. The inner surface 712 may have one or more sealing protrusions 718. The sealing protrusions 718 may help to create an aseptic seal against the outer surface 120 of the fitment bottom portion 112.

The spout 710 may include an attachment flange 720 to provide a surface to attach to the wall 730 of the associated container. In some embodiments such as the one shown, the container wall 730 may be made of a film material such as that of a bag-in-box container. In the full-cap position, the stand-off protrusions 616 and corresponding stand-off gaps 618 may extend beyond the attachment flange 720, preventing the container wall 730 from fully covering or entering the spout 710 and/or fitment bottom portion 112 as the contents of the container are emptied. In other embodiments, the container wall 730 could be any acceptable rigid container such as a plastic or metal container. In these rigid wall embodiments, the stand-off protrusions 616 may be omitted.

The outer surface 714 may also include an end flange 722 and a body flange 724. In some embodiments, the fitment retention ledge 122 may align with the body flange 724 when the fitment assembly 100 is inserted into the spout 710 to the full-cap position. The body flange 724 may provide additional radial support to the fitment bottom portion 112 adjacent to the fitment retention ledge 122 preventing the radial deflection of the fitment retention ledge 122 and further preventing the poppet bottom of the poppet attachment portion 152 from sliding downward past the retention ledge 122.

FIG. 8A is a cross section view of the fitment assembly 100 of FIG. 1 partially inserted into the spout 710 to a half-cap position as well as a removable cap 830 inserted into the fitment top portion 114. FIG. 8B is a perspective view of the fitment assembly 100 in the half-cap position within the spout 710 of FIG. 7A along with the removable cap 830 inserted into the fitment top portion 114.

In the half-cap position, the fitment assembly 100 is removably inserted into the spout 710. The fitment retention protrusion 124 may releasably engage a half-cap channel 812 in the spout 710 and/or a half-cap protrusion 814 on the spout 710 may releasably engage the fitment retention groove 614. The fitment assembly 100 can be inserted into the spout 710 to the half-cap position and be subsequently removed without excessive force as well as without damage to either the fitment assembly 100 or spout 710. The spout sealing protrusion 718 may create a seal against the outer surface 120 of the fitment bottom portion 112. The half-cap position may be used after assembly of the fitment assembly 100 and the container, including the spout 710 attachment to the container wall, but before the container has been filled. The half-cap position may allow the container to be transported from an assembly location to a filling location while preventing contaminants from entering the container. Once at the filling location, the container may be filled by removing the fitment assembly 100 from the spout 710, filling the container through the spout 710, and reinserting the fitment assembly 100 into the spout 710 to the full-cap position in order to seal the container. In some embodiments, the stand-off protrusions 616 may not extend beyond the attachment flange 720 when the fitment assembly 100 is inserted to the half-cap position. The fitment retention ledge 122 may not align with the body flange 724; however, the fitment retention ledge 122 should not experience significant forces in the half-cap position while the poppet sealing portion 156 of the fitment assembly 100 is kept in the closed, transportation position.

The removable cap 830 may be inserted into the fitment top portion 114 during assembly of the fitment assembly 110. The internal protrusions 144 of the fitment top portion 114 may create a seal against the removable cap wall 832, preventing contamination in the fitment top portion 114 until the removable cap 830 is removed prior to attachment of a connector assembly just prior to use. While installed within the fitment top portion 114, the removable cap 830 may also help prevent inadvertent contact with the poppet seal 150, keeping the fitment assembly 100 in the closed, transport condition. In some embodiments, a plastic shrink-wrap may be used to keep the removable cap 830 within the fitment top portion 114 and provide an indication if the cap may have previously been removed. In other embodiments, anti-tamper features may be incorporated to the removable cap 830 to show whether the cap has previously been removed.

FIG. 9A is a cross section view of an alternate fitment assembly 900 in a closed condition. FIG. 9B is a top view of the fitment assembly 900 of FIG. 9A. FIG. 9C is the bottom view of the fitment assembly 900 of FIG. 9A. The fitment assembly 900 may include a fitment 910 and a poppet seal 950 as well as a separate flexible spring element 970 within the fitment 910.

Similar to the fitment of FIG. 1, the fitment 910 includes a bottom portion 912, a top portion 914, and a neck portion 916. Instead of the sealing groove and sealing taper of the first embodiment, the fitment 910 of FIG. 9 uses a sealing protrusion 918 to create a face seal against the sealing surface 952 of the poppet seal 950. In other embodiments, the sealing protrusion 918 may be placed on the poppet seal 950 such that it seals against a corresponding flat sealing surface of the fitment 910. The fitment 910 includes an attachment channel 920 designed to receive a locking flange 972 of the flexible spring element 970 to secure the flexible spring element 970 within the fitment bottom portion 912. The fitment 910 may also include a lead up taper 922 creating a thicker wall of the bottom portion 912 on either side of the attachment channel 920 as compared to the wall thickness of the remainder of the bottom portion 912. Many of the features of the fitment 910 may be similar or identical to the fitment of the first embodiment. As with the first embodiment, the fitment 910 may include a bottom portion flange 938, a retention protrusion 940, external threads 942, stand-off protrusions 944, and stand-off gaps 946. The fitment 910 could be connected to a similar or identical spout and/or container as described with FIGS. 7 through 8.

The fitment top portion 914 may include an opening shroud 924 that extends above the top portion base area 926. The opening shroud 924 may be used to depress the connector poppet creating a flow path through an attached connector assembly. The top portion 914 also includes a centering guide 928 to receive and support the central support member 954 of the poppet seal 950. The centering guide 928 allows the central support member 954 to slide from the closed position to the open position while keeping the central support member 954 centered within the fitment 910. The centering guide 928 is held in place by one or more fitment support arms 930. The support arms 930 allow the centering guide 928 to be centered radially within the opening shroud 924 while still providing a flow path from the bottom portion 912 to the top portion 914 of the fitment 910. The poppet seal 950 may also include peripheral support members 958 that may further guide the poppet seal 950 by contacting the inner surface 932 of the opening shroud 924 and may be spaced between the fitment support arms 930. In some embodiments, the diameter of the opening shroud inner surface 932 may be smaller than the inner diameter 934 of the neck portion 916 creating a fitment neck cavity 936. In other embodiments, such as a fitment without an opening shroud 924, the centering guide 928 and/or support arms 930 may be located completely below the top portion base area 926 and within the fitment neck cavity 936.

The flexible spring element 970 may include one or more flexible arms 974. Similar to the poppet deformable portion of the first embodiment, the flexible arms 974 provide a reactionary force when compressed downward to help force the poppet sealing surface 952 upward into contact with the fitment sealing protrusion 918 once the external force is removed, such as after removing a connector assembly. In the closed position of FIG. 9, the flexible arms 974 may be compressed slightly in order to maintain a seal between the fitment sealing protrusion 918 and the poppet sealing surface 952. The spaces between the flexible arms 974 form flow holes 976 creating a flow path past the flexible spring element 970 when the fitment assembly 900 is in the open position.

Similar to the fitment assembly of FIG. 1, the fitment 910, the poppet seal 950, and the flexible spring element 970 may be molded plastic components to enhance the recyclability of the container after use.

Figure 10A:
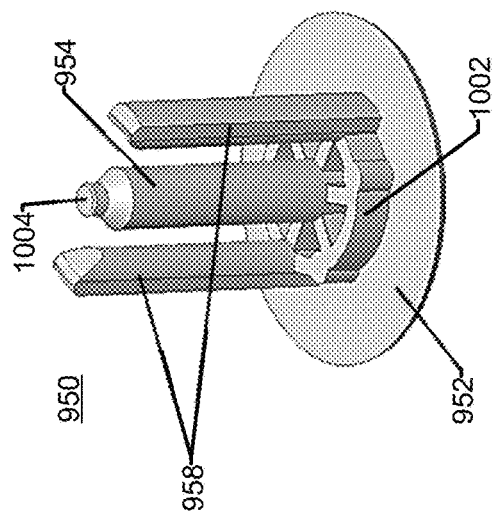
FIG. 10A is an upper perspective view of the poppet seal of FIG. 9A.
Figure 10B:
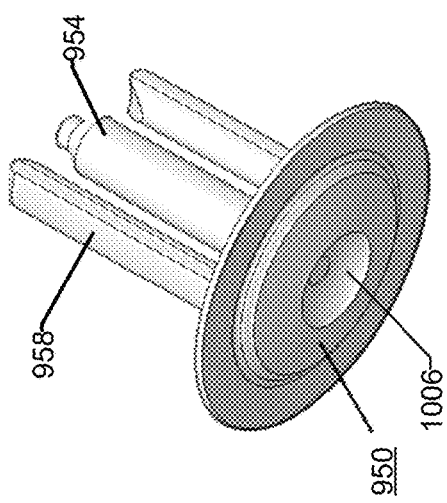
FIG. 10B is a lower perspective view of the poppet seal of FIG. 9A.

FIG. 10A is an upper perspective view of the poppet seal 950 of FIG. 9A. FIG. 10B is a lower perspective view of the poppet seal 950 of FIG. 9A.

The poppet seal 950 may also include a member base 1002. The member base 1002 may extend from the poppet sealing surface 952 to provide additional rigidity to the sealing surface 952 as well as provide a structure for the central support member 954 and peripheral support members 958 to extend from. The central support member 954 also includes a poppet engagement surface 1004. The poppet engagement surface 1004 may provide a contact surface for a connector assembly to contact and depress the poppet 950 to place the fitment assembly 900 in the open condition. In other embodiments, one or more of the peripheral support members 958 could have poppet engagement surfaces to provide the contact area to place the fitment assembly 900 in the open condition in addition to or instead of the poppet engagement surface 1004 of the central support member 954. The lower portion of the poppet seal 950 may have a centering indent 1006. The centering indent 1006 may engage a centering protrusion of the flexible spring element 970 in order to keep the poppet seal 950 centered on the flexible spring element as the poppet seal 950 opens and closes.

Figure 11A:
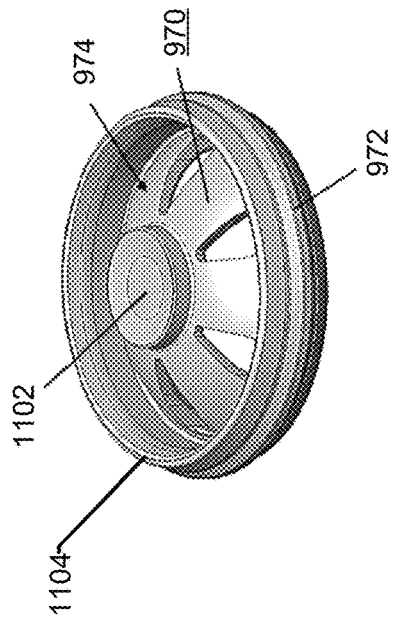
FIG. 11A is an upper perspective view of the flexible member of FIG. 9A.
Figure 11B:
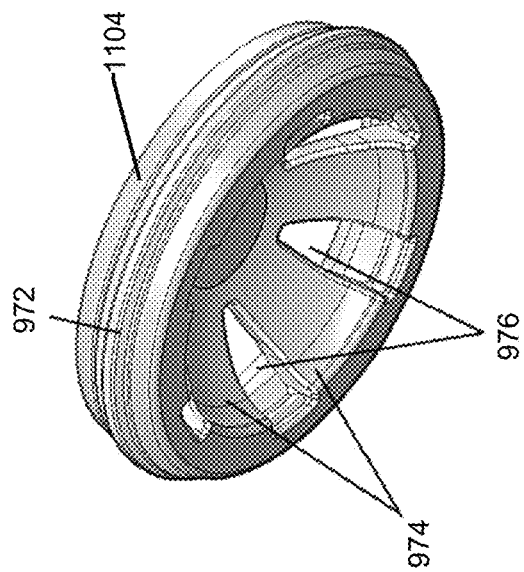
FIG. 11B is a lower perspective view of the flexible member of FIG. 9A.

FIG. 11A is an upper perspective view of the flexible spring element 970 of FIG. 9A. FIG. 11B is a lower perspective view of the flexible spring element 970 of FIG. 9A.

The flexible spring element 970 includes a centering protrusion 1102 in the center of the flexible arms 974 and flow holes 976. The centering protrusion 1102 may abut against the corresponding centering indent 1006 of the poppet seal 950. In other embodiments, the locations of the protrusion and indent may be reversed such that the centering protrusion may be on the poppet seal 950 and the indent would be on the flexible spring element 970. In the embodiments with the centering protrusion on the poppet seal 950, the indent on the flexible spring element 970 may be replaced with an opening to receive the centering protrusion. In other embodiments, the poppet seal 950 and flexible spring element 970 may be created as a single component or attached to each other by an adhesive, sonic welding, or other similar method potentially eliminating the need for a protrusion and corresponding indent. In yet other embodiments, the interface between the poppet seal 950 and the flexible spring element 970 may provide sufficient support for the poppet seal 950 without corresponding protrusions and indents.

The locking flange 972 may extend from the outer wall 1104 of the flexible spring element 970. The outer wall 1104 may provide additional rigidity to the locking flange 972 to help secure the locking flange 972 in its installed position within the fitment assembly.

Figure 12:
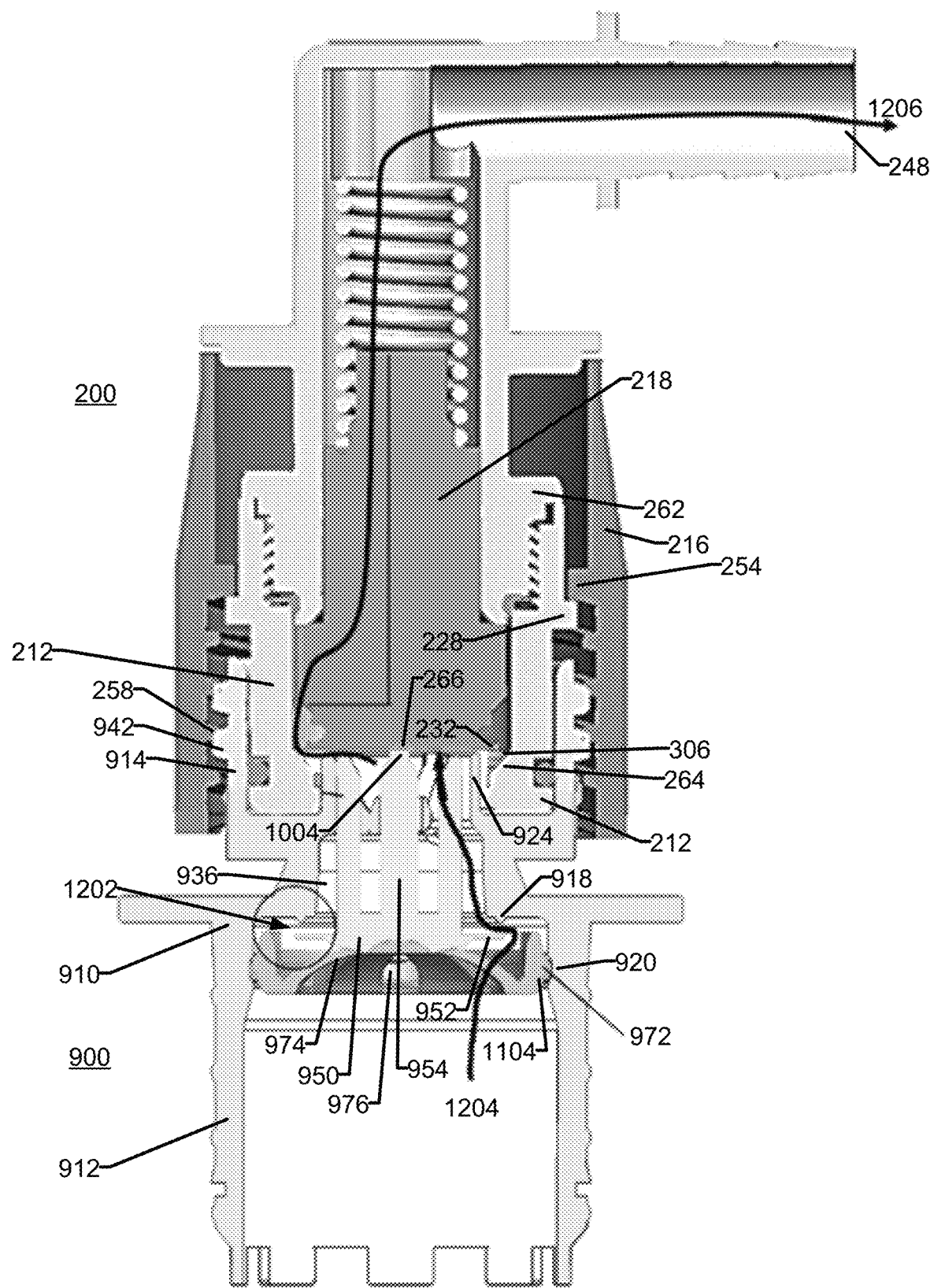
FIG. 12 is a cross section view of the fitment assembly of FIG. 9A in the open position with the connector assembly of FIG. 2A attached, in accordance with aspects of this disclosure.

FIG. 12 shows a cross section view of the connector assembly 200 of FIG. 2 attached to the fitment assembly 900 of FIG. 9 with the fitment assembly 900 in the open position. Similar to FIG. 3, the connector assembly 200 has been screwed to the fitment assembly 900 such that the connector threads 258 of the connector collar 216 are engaged with the external threads 942 of the fitment 910 and the closing ledge 254 of the connector collar 216 is engaged with the retention flange 228 of the lower connector body 212, with the lower connector body 212 having been driven into the top portion 914 of the fitment 910.

As the lower connector body 212 continues to enter the fitment top portion 914, the connector poppet mating surface 266 may press poppet engagement surface 1004 of the central support member 954 downward towards the fitment bottom portion 912, separating and forming a gap 1202 between the poppet sealing surface 952 from the fitment sealing protrusion 918. This forms a flow path 1204 from the fitment bottom portion 912, through the flow holes 976, past the poppet seal 950, through the fitment neck cavity 936, and/or to the fitment top portion 914. The downward movement of the poppet seal 950 also compresses the flexible arms 974 of the flexible spring element 970 as the engagement between the locking flange 972 and fitment attachment channel 920 holds the outer wall 1104 of the flexible spring element 970 in place. The compression of the flexible arms 974 creates a stored energy for the subsequent closing of the fitment assembly 900 during the subsequent removal of the connector assembly 200 from the fitment assembly 900.

At the same time as the lower connector body 212 continues to enter the top portion 914 of the fitment 910, fitment opening shroud 924 may resistibly abut against the connector poppet 218 and forcing the connector poppet 218 upward further into the connector upper portion 262. This creates the connector gap 306 between the connector poppet sealing surface 232 and the lower connector body sealing surface 264 creating the flow path 1206 through and out the outlet 248 of the connector assembly 200.

The embodiments disclosed herein provide the advantage of being an all plastic fitment assembly, allowing the fitment assembly to be recycled with the associated bag in box container, while still providing the ability to open and seal the container both before and after dispensing fluid from the container while also providing adequate flow through the fitment when in the open position.

It will be understood by those skilled in the art that various changes may be made and equivalents may be substituted without departing from the scope of the novel techniques disclosed in this application. In addition, many modifications may be made to adapt a particular situation or material to the teachings of the novel techniques without departing from its scope. Therefore, it is intended that the novel techniques not be limited to the particular techniques disclosed, but that they will include all techniques falling within the scope of the appended claims.

The invention claimed is:

1. A fitment assembly for use with a fluid container, the fitment assembly comprising:
    a fitment, the fitment comprising a bottom portion, a top portion, and a sealing area; and
    a poppet seal, the poppet seal comprising a sealing portion, a flexible portion, and an attachment portion;
    wherein:
        the attachment portion of the poppet seal is secured to the bottom portion of the fitment;
        the fitment assembly having a closed position wherein the flexible portion undergoes a first amount of deflection which holds the poppet sealing portion in contact with the fitment sealing area, preventing fluid flow from the fitment bottom portion to the fitment top portion; and
        the fitment assembly having an open position wherein the flexible portion undergoes a second amount of deflection that is greater than the first amount of deflection and the poppet sealing portion is not in contact with the fitment sealing area, allowing fluid flow between the fitment bottom portion and the fitment top portion; and
        wherein the fitment sealing area includes a tapered sealing surface, the poppet sealing portion includes a tapered sealing surface, and the contact between the fitment assembly and the poppet seal in the closed position occurs at the poppet tapered sealing surface and the fitment tapered sealing surface.

2. The fitment assembly of claim 1, wherein the poppet attachment portion includes a through hole to provide a flow path past the attachment portion when the fitment assembly is in the open position.

3. The fitment assembly of claim 1, wherein the poppet flexible portion includes a through hole to provide a flow path past the flexible portion when the fitment assembly is in the open position.

4. The fitment assembly of claim 1, wherein the fitment further comprises a sealing skirt that extends into the fitment bottom portion, and the fitment tapered sealing surface is located on the sealing skirt.

5. The fitment assembly of claim 1, wherein the fitment sealing area includes a sealing protrusion and the poppet sealing portion includes a flat sealing surface such that, in the closed position, the fitment sealing protrusion forms a face seal against the poppet flat sealing surface.

6. The fitment assembly of claim 1, wherein the fitment further comprises an attachment skirt that extends into the fitment bottom portion, the poppet attachment portion includes an attachment channel, and a portion of the attachment skirt is inserted into the poppet attachment channel.

7. The fitment assembly of claim 6, wherein the attachment skirt further includes a skirt protrusion, the poppet attachment portion further includes an attachment ledge, and the skirt protrusion abuts against the attachment ledge.

8. The fitment assembly of claim 1, wherein the fitment assembly has a transportation position wherein the contact between the fitment sealing area and the poppet sealing portion maintains the poppet sealing portion in place in the fitment assembly and the contact between the fitment sealing area and the poppet sealing portion creates a fluid seal between the fitment bottom portion and the fitment top portion.

9. The fitment assembly of claim 8, wherein a non-tapered sealing surface on the poppet sealing portion creates the fluid seal with the fitment sealing area.

10. The fitment assembly of claim 8, wherein the poppet sealing portion contacts the fitment sealing area within a sealing groove when the fitment assembly is in the transportation position.

11. The fitment assembly of claim 1, wherein a central support member extends from the poppet sealing portion into the fitment top portion when the fitment assembly is in the closed position.

12. The fitment assembly of claim 1, wherein peripheral support members extend from the poppet sealing portion into the fitment top portion when the fitment assembly is in the closed position.

13. The fitment assembly of claim 12, wherein the peripheral support members form a flow channel when the fitment assembly is in the open position.

14. The fitment assembly of claim 13, wherein a peripheral support connector connects the outer edges of two or more peripheral support members.

15. The fitment assembly of claim 11, wherein the fitment further comprises a support arm and a centering guide, the support arm configured to extend from the fitment and support the centering guide, and the centering guide configured to receive the poppet central support member and allow the central support member to slide between the open to the closed position.

16. The fitment assembly of claim 1, wherein the fitment further comprises an opening shroud, the opening shroud having a cylindrical shape that extends into the top portion of the fitment.

17. A fitment assembly for use with a fluid container, the fitment assembly comprising:
  a fitment, the fitment comprising a bottom portion, a top portion, and a sealing area; and
  a poppet seal, the poppet seal comprising a flexible portion, an attachment portion, a sealing portion and a support portion, the support portion further comprising a central support member and a plurality of peripheral support members, the peripheral support members extending radially outward from the central support member;
  wherein:
    the attachment portion of the flexible element is secured to the bottom portion of the fitment;
    the fitment assembly having a closed position wherein the flexible portion undergoes a first amount of deflection which holds the poppet sealing portion in contact with the fitment sealing area, preventing fluid flow from the fitment bottom portion to the fitment top portion; and
    the fitment assembly having an open position wherein the flexible portion undergoes a second amount of deflection that is greater than the first amount of deflection and the poppet sealing portion is not in contact with the fitment sealing area, allowing fluid flow between the fitment bottom portion and the fitment top portion, and the peripheral support members slide within the fitment sealing portion to maintain the poppet sealing portion and support portion centered within the fitment.

18. A fitment assembly for use with a fluid container, the fitment assembly comprising:
  a fitment, the fitment comprising a bottom portion, a top portion, and a sealing area, the top portion further comprising:
    an opening shroud, the opening shroud having a cylindrical shape that extends into the top portion;
    a support arm that extends inward from the opening shroud; and
    a centering guide, the centering guide having a cylindrical shape and attached to the support arm; and
  a poppet seal, the poppet seal comprising a sealing portion, a flexible portion, an attachment portion, and a central support member, the central support member extends from the sealing portion;
  wherein:
    the attachment portion of the poppet seal is secured to the bottom portion of the fitment;
    the centering guide slidably receives the central support member;
    the fitment assembly has a closed position wherein the flexible portion undergoes a first amount of deflection which holds the poppet sealing portion in contact with the fitment sealing area, preventing fluid flow from the fitment bottom portion to the fitment top portion; and
    the fitment assembly having an open position wherein the flexible portion undergoes a second amount of deflection that is greater than the first amount of deflection and the poppet sealing portion is not in contact with the fitment sealing area, allowing fluid flow between the fitment bottom portion and the fitment top portion.

19. A fitment assembly for use with a fluid container, the fitment assembly comprising:
  a fitment, the fitment comprising a bottom portion, a top portion, and a sealing area; and
  a poppet seal, the poppet seal comprising a sealing portion, a flexible portion, and an attachment portion;
  wherein:
    the attachment portion of the poppet seal is secured to the bottom portion of the fitment;
    the fitment assembly having a closed position wherein the flexible portion undergoes a first amount of deflection which holds the poppet sealing portion in contact with the fitment sealing area, preventing fluid flow from the fitment bottom portion to the fitment top portion; and
  the fitment assembly having an open position wherein the flexible portion undergoes a second amount of deflection that is greater than the first amount of deflection and the poppet sealing portion is not in contact with the fitment sealing area, allowing fluid flow between the fitment bottom portion and the fitment top portion; and
  wherein the fitment sealing area includes a sealing protrusion and the poppet sealing portion includes a flat sealing surface such that, in the closed position, the fitment sealing protrusion forms a face seal against the poppet flat sealing surface.

\* \* \* \* \*